Patented Nov. 29, 1938

2,138,778

UNITED STATES PATENT OFFICE 2,138,778

CELLULOSE ESTERS OF ORGANIC SULPHONIC ACIDS AND PREPARATION THEREOF

George W. Rigby, Wilmington, Del., assignor to E. I. du Pont de Nemours & Company, Wilmington, Del., a corporation of Delaware No Drawing. Application March 17, 1937, Serial No. 131,437

30 Claims. (Cl. 260—100)

This invention relates to the preparation of cellulose derivatives, more particularly it relates to the preparation of substantially undegraded cellulose esters of organically substituted inorganic acids, still more particularly it relates to the preparation of substantially undegraded organic sulphonic acid esters of cellulose and of cellulose esters and cellulose ethers. The invention further relates to new substantially undegraded cellulose derivatives containing sulphonic acid ester groups. This invention is a continuation-in-part of applicant's copending application Serial No. 740,060 filed August 16, 1934.

This invention has as an object the preparation of cellulose esters of inorganic acids containing organic substituents in an improved manner. A further object is the preparation of cellulose esters of organic sulphonic acids in a manner which does not degrade the cellulosic nucleus. A still further object is the preparation of substantially undegraded cellulose esters of organic sulphonic acids which contain an appreciable amount of ester group. A still further object is the production of cellulose derivatives containing organic sulphonic acid ester groups which form clear, transparent, flexible films. Other objects include the preparation of new cellulose derivatives and a general advancement of the art. Still further objects will appear hereinafter.

These objects are accomplished by the following invention wherein a substance having a cellulosic nucleus and containing esterifiable hydroxyls is reacted, in the presence of a tertiary base, with a halide of an organically substituted inorganic acid. In a more limited sense, the objects are accomplished by reacting under anhydrous conditions cellulose or a cellulose ether, ester, or mixed ether-ester, in the presence of a tertiary organic base, with a halide of an organic sulphonic acid at a temperature below 90° C. for a length of time such that the product is at least swollen by, and preferably soluble in the tertiary base. In the preferred embodiment of the invention, the above and other objects are accomplished by reacting cellulose or an undegraded derivative thereof which contains the cellulosic nucleus and esterifiable hydroxyl groups, under anhydrous conditions in the presence of a tertiary organic base, with an organic sulphonic acid halide at a temperature below 90° C. for a length of time such that the product is soluble in the tertiary base.

One embodiment of the invention as described in aforesaid parent application may be exemplified in the preparation of the paratoluene sulphonic acid ester of cellulose. Pure, dry paratoluenesulphonyl chloride is added to pure, dry pyridine and dry cellulose. The mixture is heated, for example to 75° C., until the cellulose has completely dissolved to give a light amber, viscous solution. The product is isolated by pouring into a suitable precipitant such as methyl alcohol and extracted with a similar liquid until free from halogen. The cellulose paratoluenesulphonate thus prepared is soluble in such organic solvents as pyridine, chloroform, chloroform-alcohol, and other typical solvents, but is insoluble in ethyl acetate, dioxane, or acetone. The viscous solutions of the cellulose paratoluenesulphonate are suitable for the preparation of films, threads, ribbons, filaments, and the like.

I have discovered that cellulose esters of organic sulphonic acids which are practically free of color and are substantially undegraded are readily obtained by reacting either cellulose, a cellulose derivative, i. e. an ester, ether, or mixed ether-ester under anhydrous conditions in the presence of tertiary organic base at temperatures below 90° C. If an undegraded cellulose derivative is used as the initial cellulosic reactant, my process does not cause degradation of the cellulosic nucleus.

I have found that the presence of even traces of moisture and the use of temperatures substantially above 90° C. have a very detrimental effect upon the reactions involved in the present invention. If slight amounts of water are present in any of the reactants, the reaction medium becomes darkly colored immediately upon mixing the reactants and the final products are dark in color. Thus, water must be rigorously excluded from each of the reactants and from the reaction zone if substantially colorless products are to be obtained. Since some of the reactions coming within the scope of the present invention require periods varying up to above thirty days for completion, the presence of even a trace of moisture is serious because the formation occurs throughout the period of reaction. The marked sensitiveness of the reaction to moisture is shown by the fact that a mixture of dry cotton linters and anhydrous para-toluene sulphonyl chloride turns black almost immediately upon addition of ordinary pyridine with considerable evolution of heat. The product obtained after reaction at 50° C. for 12 days was dark in color. The above-described experiment was repeated using anhydrous cotton linters, anhydrous pyridine, and freshly distilled anhydrous para-toluene sulphonyl chloride and under these conditions a practically colorless product was obtained which formed clear, transparent, flexible, water-resistant, strong films.

The process of the present invention may be exemplified by the following experiment:

Pure, anhydrous para-toluene sulphonyl chloride is added to freshly distilled anhydrous pyridine, and anhydrous cellulose. The mixture is heated, for example to 75° C., until the cellulose has completely dissolved to give a light amber, viscous solution. The product is isolated by pouring into a suitable precipitant such as methyl alcohol and extracted with a similar liquid until free from halogen. The cellulose para-toluene sulphonate thus prepared is soluble in such organic solvents as pyridine, chloroform, chloroform-alcohol mixtures, etc., but is insoluble in ethyl acetate, dioxan, or acetone. The viscous solutions of the cellulose paratoluene-sulphonate are suitable for the preparation of films, threads, ribbons, filaments, and the like.

Having outlined above the general principles of the invention, the following examples are added for purposes of illustration and not in limitation.

Example I

Five hundred and eighty-five (585) parts of anhydrous para-toluenesulphonyl chloride were dissolved in 486 parts of anhydrous pyridine. To this solution were added 99 parts of anhydrous cotton linters pulp. The mixture was heated at 50° C. for 120 hours. At the end of this time the solution was poured into an excess of methanol. The ester was filtered off and extracted with methanol until free from halogen. The yield of derivative was 280 parts, which corresponded to 1.74 ester groups per glucose unit.

Example II

The ester obtained in Example I was dispersed in 1000 parts of anhydrous pyridine, in which 580 parts of anhydrous para-toluene-sulphonyl chloride had been dissolved. The mixture was heated at 50° C. for 160 hours, then filtered and poured into a large excess of methanol. The precipitated ester was extracted with methanol until halogen-free. The yield of purified ester was 323 parts. The ester was undegraded and soluble in chlorinated solvents to give clear viscous solutions, from which films were cast. The product contained 2.4 ester groups per $C_6H_{10}O_5$.

Example III

Fifty (50) parts of anhydrous ethyl cellulose containing 16% of ethyl group were added to a solution of 470 parts of anhydrous para-toluene sulphonyl chloride in 780 parts of anhydrous pyridine. The mixture was heated at 50° C. for 144 hours, then filtered and precipitated by pouring into a large excess of methanol. The solid was filtered off and extracted with methanol until free from halogen, then dried at 100° C. The yield was 106 parts of mixed ether-ester, which was soluble in such organic solvents as chloroform, dioxan, and benzyl alcohol. It contained 1.25 ester groups and one ethyl group per $C_6H_{10}O_5$.

Example IV

One hundred and thirty (130) parts of the washed and dried reaction product, prepared from alkali cellulose and para-toluene sulphonyl chloride, according to copending application Ser. No. 744,665, filed Sept. 19, 1934, were mixed with 475 parts of anhydrous pyridine, and 760 parts of anhydrous para-toluene sulphonyl chloride. The mixture was agitated at room temperature for twelve days, filtered and precipitated by pouring into a large excess of methanol. The solid ester was filtered off and extracted with methanol until halogen-free.

Example V

One hundred (100) parts of anhydrous cellulose triphenyl-methyl ether and 190 parts of anhydrous benzene-sulphonyl chloride were dissolved in 200 parts of anhydrous pyridine. The mixture was heated at 75° C. for 48 hours. The solution was filtered and poured into a large excess of methanol. The solid was filtered off, extracted with methanol until halogen-free, and dried at 75° C. Analysis showed 8.23% sulphur, which corresponded approximately to a cellulose dibenzenesulphonate monotriphenylmethyl ether.

Example VI

One hundred and sixty-two (162) parts of cotton linters pulp were treated with 1784 parts of 95% sulphuric acid to which had been added 716 parts of water. The mixture was maintained at 0 to +5° C. for 20 minutes during which the cotton gradually swelled and became gelatinous. The mass was then poured into 20,000 parts of cracked ice with vigorous mechanical stirring during one half (½) hour. The gelatinous solid was then filtered off and repeatedly washed with distilled water until the washings were neutral to methyl red. The solid, after pressing to 2000 pounds per square inch in a hydraulic press to remove excess water, was macerated with 6000 parts of pyridine, filtered, and again macerated with 6000 parts of pyridine. Most of the pyridine was removed by distillation and a mixture of 1520 parts of freshly distilled para-toluene sulphonyl chloride dissolved in 1900 parts of anhydrous pyridine was added to the suspension. The mixture was then heated at 90° C. for 17½ hours when a uniform, viscous solution was obtained. The cellulose para-toluene sulphonate was isolated by pouring this solution into 15,000 parts of 50% aqueous methanol with vigorous stirring. The white fibrous product so obtained was washed with methanol until the washings were halogen-free and was dried at 50° C. The yield was 376 parts.

It will be noted that sulphuric acid pretreatment of the cellulose materially increased the rate of esterification (Example I required 120 hours). However, this treatment is known to materially degrade cellulose as compared with untreated cellulose. Similar results have been obtained with other "hydro-celluloses" such as "Gerard hydrocellulose" and "hydrocellulose" prepared by treating native cellulose with dry hydrogen chloride.

Example VII

Five hundred and eighty-five parts of pure paratoluenesulphonyl chloride were dissolved in 486 parts of dry pyridine. To this solution were added 99 parts of dry cotton linters pulp. The mixture was heated at 50° C. for 120 hours. At the end of this time the solution was poured into an excess of methanol. The ester was filtered off and extracted with methanol until free from halogen. The yield of derivative was 280 parts, which corresponded to 1.74 ester groups per glucose unit.

Example VIII

The ester obtained in Example VII was dispersed in 1,000 parts of pyridine, in which 580 parts of paratoluenesulphonyl chloride had been dissolved. The mixture was heated at 50° C. for 160 hours, then filtered and poured into a large excess of methanol. The pure white precipitated ester was extracted with methanol until halogen free. The yield amounted to 323 parts of pure white paratoluenesulphonate. The ester was soluble in chlorinated solvents to give clear viscous solutions, from which films were cast. The product contained 2.4 ester groups per $C_6H_{10}O_5$.

*Example IX*

Fifty parts of ethyl cellulose containing 16% of ethyl group were added to a solution of 470 parts of paratoluenesulphonyl chloride in 780 parts of pyridine. The mixture was heated at 50° C. for 144 hours, then filtered and precipitated by pouring into a large excess of methanol. The solid was filtered off and extracted with methanol until free from halogen, then dried at 100° C. The yield was 106 parts of mixed ether ester, which was soluble in such organic solvents as chloroform, dioxane, and benzyl alcohol. It contained 1.25 ester groups and one ethyl group per $C_6H_{10}O_5$.

*Example X*

One hundred and thirty parts of the washed and dried reaction product, prepared from alkali cellulose and paratoluenesulphonyl chloride were mixed with 475 parts of pyridine and 760 parts of paratoluenesulphonyl chloride. The mixture was agitated at room temperature for twelve days, filtered and precipitated by pouring into a large excess of methanol. The solid ester was filtered off and extracted with methanol until halogen free.

*Example XI*

One hundred parts of cellulose triphenylmethyl ether and 190 parts of benzenesulphonyl chloride were dissolved in 200 parts of pyridine. The mixture was heated at 75° C. for 48 hours. The solution was filtered off, extracted with methanol until halogen free, and dried at 75° C. Analysis showed 8.23% sulphur, which corresponded approximately to a cellulose dibenzenesulphonate monotriphenylmethyl ether.

The cellulose and derivatives used in the foregoing examples were of the undegraded and slightly degraded type. Degraded forms may be substituted with similar results. Generally, solubility in organic solvents increases with increasing degree of degradation of the cellulose derivative reactant employed.

As esterifiable materials containing the cellulosic nucleus and containing esterifiable hydroxyls, any of the ordinary varieties of cellulose such as wood pulp, cotton linters, hydro- and oxycellulose may be used. Any partially substituted cellulose derivatives such as cellulose glycollic acid, methyl cellulose, propyl cellulose, cellulose acetate, cellulose propionate, cellulose formate, glycol cellulose, benzyl cellulose, and other pretreated or partially substituted celluloses may be used. Other carbohydrates such as starch, galactan, inulin, glycogen, and polysaccharides in general may be used in place of cellulose.

Solubility of the ester may be promoted by the use of catalysts such as pyridine hydrochloride, hydrobromide, or sulphate, benzylpyridinium chloride, ethylpyridinium chloride, and other substances which have a pronounced swelling action on cellulose.

In place of pyridine other tertiary bases such as the picolines including alpha-picoline, the lutidines, and quinoline, and other heterocyclic tertiary bases may be employed. Tertiary aliphatic or aromatic amines such as tributylamine or dimethylaniline may be used, but the heterocyclic bases are greatly preferred.

The temperature of the reaction is of the highest importance. When pyridine and an organic sulpho-halide are used, the temperature must be kept as low as practicable. Temperatures of from 0° to 90° C. may be employed. Above 90° C. the colored by-products become extremely troublesome, and at 100° C. and above the by-product forming reaction takes place almost exclusively leaving the cellulose for the most part unreacted. A temperature of between 40° and 80° C. is preferred, and optimum conditions are obtained at 50° to 60° C. whereby much more uniform reactions and practically no colored by-products are obtained. In the case of organic bases other than pyridine, optimum conditions may be somewhat different but should be chosen for each case.

The time of reaction depends on the temperature chosen and on the proportion of reagent used. Thus, by increasing the ratio of paratoluenesulphochloride to cellulose, the rate of esterification may be increased. Suitable time of reaction depends in each case upon the degree of substitution desired and upon the solubility characteristics which are deemed necessary.

The proportions of reagent may be varied within rather wide limits depending upon the properties of the products desired.

Diluents may be used in the above reaction. In general, diluents retard the rate of reaction. The following table shows the results obtained by reacting 1 mol of cellulose containing 0.73 paratoluene sulphonyl groups per glucose residue with 8 mols of para-toluene sulphonyl chloride, and 24 mols of pyridine at 50° C. in the presence of 600 parts of diluent per 85 parts of cellulose derivative.

TABLE I

*Relative rates of esterification at 50° C. and 576 hours*

| Diluent | Increase in ester group per $C_6$ unit | Relative value |
| --- | --- | --- |
| Di-n-butyl ether | 1.86 | 100 |
| Chlorobenzene | 1.15 | 62 |
| Benzene | 1.14 | 61 |
| Di-benzyl ether | 1.14 | 61 |
| Dioxane | 1.10 | 59 |
| Glacial acetic acid | 0.43 | 23 |
| Nitrobenzene | 0.25 | 13 |
| Toluene | 0.18 | 10 |
| Tetrachloroethane | 0.13 | 7 |
| Chloroform | 0.09 | 5 |

From the above table it is to be noted that the type of diluent has a pronounced effect upon the rate of esterification.

The product may be fibrous in the reaction mixture, or may be in solution, depending on the time, temperature and diluent used, as well as upon the amount of reagent used. Thus, increasing the time of esterification increases the solubility of the resulting esters. Furthermore, using low temperatures promotes esterification without promoting solubility. Use of certain diluents such as di-n-butyl ether causes the cellulose ester to retain its fibrous character.

While the description given is confined to benzene and para-toluene sulphonyl chlorides, other organically substituted sulphonyl chlorides in general may be used. Examples of these are methansulphonyl chloride, ethanesulphonyl chloride, aniline-trisulphonyl chloride, dodecanesulphonyl chloride, alpha and beta naphthylsulphonyl chloride, para-phenylbenzene sulphonyl chloride, etc. Moreover other organically substituted inorganic acid halides, e. g., diphenyl phosphoryl chloride, diphenyl phosphonyl chloride, etc. may also be used.

Purification is easily effected with methanol, although other liquids in which cellulose para-toluene sulphonate is insoluble may be used. These include water, denatured alcohol, benzene, toluene and ethyl acetate.

The organically substituted inorganic esters produced by the process of the present invention are particularly resistant to moisture, acids, and alkalis, thus making them useful for coatings, films, plastics, threads, bands, and the like. They are also useful in securing non-inflammability and may be used in various compositions for this purpose. They may be used as intermediates in the formation of other cellulose derivatives as, for example, amino celluloses by reacting the cellulose ester, for example the cellulose para-toluene sulphonate, dissolved or suspended in an inert liquid, such as dioxan, dibenzyl ether, benzyl alcohol, pyridine, etc., with ammonia or a primary or secondary amine, for example, diethylamine, benzylamine, di-n-butylamine, aniline, methyl aniline, or the like, at a temperature preferably above 100° C. in the essential absence of oxygen and moisture, preferably in the presence of the amide reaction by-product.

Especially for use as intermediates in the preparation of cellulose amine the products of the present invention should contain at least ¼ mol of substituent per C₆ unit of the cellulose, since esters of lower substitution on conversion to the amine give products not swelling in dilute acetic acid, and therefore not readily convertible to desired shapes and forms. Those products containing at least ¼ mol of substituent per C₆ unit are swollen by pyridine and thus are useful products convertible to desirable shapes.

The above description and examples are intended to be illustrative only. Any modification of or variation therefrom which conforms to the spirit of the invention is intended to be included within the scope of the claims.

I claim:

1. Process of preparing cellulose esters which comprises reacting an anhydrous substance having the cellulosic nucleus and containing esterifiable hydroxyls with an excess of a halide of polyhydroxy mineral acid in which one of the hydroxyl groups is replaced by a hydrocarbon radical in the presence of an anhydrous tertiary base at a temperature from 0° C. to 90° C. until the product is at least swollen by pyridine and contains at least ¼ mol per C₆ unit of cellulose, of organically substituted inorganic acid substituent, in the presence of an inert liquid diluent.

2. Process of preparing cellulose esters which comprises reacting an anhydrous substance having the cellulosic nucleus and containing esterifiable hydroxyls with an excess of a halide of polyhydroxy mineral acid in which one of the hydroxyl groups is replaced by a hydrocarbon radical in the presence of an anhydrous tertiary base at a temperature from 0° C. to 90° C. until the product is at least swollen by pyridine and contains at least ¼ mol, per C₆ unit of cellulose, of organically substituted inorganic acid substituent.

3. The process of preparing cellulose esters which comprises reacting a substance having the cellulosic nucleus and containing esterifiable hydroxyl groups with an excess of a halide of an organic sulphonic acid in the presence of a tertiary base at a temperature from 0° C. to 90° C. under anhydrous conditions until the product is at least swollen by pyridine.

4. The process of preparing cellulose esters which comprises reacting cellulose with an excess of a halide of an organic sulphonic acid in the presence of a tertiary base at a temperature from 0° C. to 90° C. under anhydrous conditions until the product is at least swollen by pyridine.

5. The process of preparing cellulose esters which comprises reacting a cellulose ester containing esterifiable hydroxyl groups with an excess of a halide of an organic sulphonic acid in the presence of a tertiary base at a temperature from 0° to 90° C. under anhydrous conditions until the product is at least swollen by pyridine.

6. The process of preparing cellulose esters which comprises reacting a cellulose ether containing esterifiable hydroxyl groups with an excess of a halide of an organic sulphonic acid in the presence of a tertiary base at a temperature from 0° C. to 90° C. under anhydrous conditions until the product is at least swollen by pyridine.

7. Process of preparing cellulose esters which comprises reacting a substance having the cellulosic nucleus and containing esterifiable hydroxyl groups with an excess of an organic sulphonyl halide in the presence of a tertiary base under anhydrous conditions at a temperature of 40° C. to 80° C. until the product is at least swollen by pyridine.

8. The process of preparing cellulose derivatives which are substantially undegraded which comprises reacting under anhydrous conditions a substance having the cellulosic nucleus and containing esterifiable hydroxyls with an excess of an anhydrous organic sulphonyl halide in the presence of anhydrous pyridine, at a temperature of 40° C. to 80° C. until the product is at least swollen by pyridine.

9. The preparation of a cellulose derivative containing a sulphonic acid radical which comprises reacting upon an undegraded cellulose derivative containing esterifiable hydroxyl groups with an aryl sulphohalide in the presence of an organic base selected from the group consisting of pyridine, alpha-picoline, and quinoline.

10. The preparation of a cellulose derivative containing a sulphonic acid radical which comprises reacting upon an undegraded cellulose derivative containing esterifiable hydroxyl groups with an organic sulphohalide in the presence of pyridine.

11. The preparation of a cellulose derivative containing a sulphonic acid radical which comprises reacting upon an undegraded cellulose derivative containing esterifiable hydroxyl groups with an aryl sulphochloride in the presence of pyridine.

12. The preparation of a cellulose derivative containing a sulphonic acid radical which comprises reacting upon an undegraded cellulose derivative containing esterifiable hydroxyl groups with an organic sulphohalide in the presence of an organic base selected from the group consisting of pyridine, alpha-picoline, and quinoline.

13. A process of preparing cellulose esters which comprises reacting a dry substance having a cellulosic nucleus and containing esterifiable hydroxyls with an excess of a halide of a polyhydroxy mineral acid in which one of the hydroxyl groups is replaced by a hydrocarbon radical in the presence of a tertiary base at a temperature from 0° to 90° C. until the product is at least swollen by pyridine, and contains at least ¼ mol per $C_6$ unit of cellulose of organically substituted inorganic acid substituent.

14. Process of preparing cellulose esters, which comprises reacting a dry substance having the cellulosic nucleus and containing esterifiable hydroxyls with an excess of a halide of an organic sulphonic acid in the presence of a tertiary base at a temperature from 0° C. to 90° C. until the product is at least swollen by pyridine, and contains at least ¼ mol, per $C_6$ unit of the cellulose, of organic sulphonic acid substituent.

15. Process of preparing cellulose esters, which comprises reacting a dry substance having the cellulosic nucleus and containing esterifiable hydroxyls with an excess of an organic sulphonyl halide in the presence of a tertiary base at a temperature from 0° C. to 90° C. until the product is at least swollen by pyridine, and contains at least ¼ mol per $C_6$ unit of the cellulose, of paratoluenesulphonic acid substituent.

16. A process of preparing cellulose esters which comprises reacting dry cellulose with an excess of a halide of a polyhydroxy mineral acid in which one of the hydroxyl groups has been replaced by a hydrocarbon radical in the presence of a tertiary base at a temperature from 0° to 90° C. until the product is at least swollen by pyridine and contains at least ¼ mol per $C_6$ unit of cellulose of organically substituted inorganic acid substituent.

17. Process of preparing cellulose esters, which comprises reacting dry cellulose with an excess of a halide of an organic sulphonic acid in the presence of a tertiary base at a temperature from 0° C. to 90° C. until the product is at least swollen by pyridine, and contains at least ¼ mol per $C_6$ unit of the cellulose, of organic sulphonic acid substituent.

18. Process of preparing cellulose esters, which comprises reacting cellulose with an excess of an organic sulphonyl halide in the presence of a tertiary base at a temperature from 0° C. to 90° C. until the product is at least swollen by pyridine, and contains at least ¼ mol per $C_6$ unit of the cellulose, of organic sulphonic acid substituent.

19. Process of preparing cellulose esters, which comprises reacting dry cellulose with an excess of dry paratoluenesulphonyl chloride in the presence of dry pyridine at a temperature of 40°–80° C. until the reaction product is at least swollen by pyridine, and contains at least ¼ mol, per $C_6$ unit of the cellulose, of paratoluenesulphonic acid substituent.

20. Process of preparing cellulose esters, which comprises reacting dry cellulose with an excess of dry paratoluenesulphonic chloride in the presure of dry pyridine at a temperature of 40°–80° C. until the reaction product is soluble in pyridine, and contains at least ¼ mol, per $C_6$ unit of the cellulose, of paratoluenesulphonic acid substituent.

21. Process of preparing cellulose esters, which comprises reacting about 99 parts of dry cellulose with about 585 parts of dry paratoluenesulphonyl chloride in the presence of about 486 parts of dry pyridine for 120 hours at 50° C. and isolating the cellulose paratoluenesulphonate by precipitation and washing with methanol.

22. Process of preparing cellulose esters, which comprises reacting a dry cellulose ether containing esterifiable hydroxyls with an excess of an organic sulphonyl halide in the presence of a tertiary base at a temperature of 40°–80° C. until the reaction product is at least swollen by pyridine and contains at least ¼ mol, per $C_6$ unit of the cellulose, of organic sulphonic acid substituent.

23. Process of preparing cellulose esters, which comprises reacting a dry cellulose ether containing esterifiable hydroxyls with an excess of benzenesulphonyl chloride in the presence of a tertiary base at a temperature of 40°–80° C. until the reaction product is at least swollen by pyridine, and contains at least ¼ mol, per $C_6$ unit of the cellulose, of benzensulphonic acid substituent.

24. Chloroform soluble esters of cellulose with organic sulphonic acids, containing at least ¼ mol, per $C_6$ unit of the cellulose, of organic sulphonic acid substituent, and being insoluble in acetone.

25. Chloroform soluble cellulose paratoluenesulphonate, containing at least ¼ mol, per $C_6$ unit of the cellulose, of paratoluenesulphonic acid substituent, and being insoluble in acetone.

26. The process of preparing cellulose esters which comprises reacting a dry substance having the cellulosic nucleus and containing esterifiable hydroxyls with an excess of a halide of an organically substituted inorganic acid in the presence of a tertiary base and a non-reactive diluent at a temperature below 90° C. until the product is at least swollen by pyridine and contains at least ¼ mol, per $C_6$ unit of the cellulose, of organically substituted inorganic acid substituent.

27. The process of preparing cellulose esters which comprises reacting dry cellulose with an excess of a halide of an organically substituted inorganic acid in the presence of a tertiary base and a non-reactive diluent at a temperature below 90° C. until the product is at least swollen by pyridine and contains at least ¼ mol, per $C_6$ unit of the cellulose, of organically substituted inorganic acid substituent.

28. The process of preparing cellulose esters which comprises reacting dry cellulose with an excess of dry paratoluenesulphonyl chloride in the presence of dry pyridine and di-n-butyl ether at a temperature of 40° C. to 80° C. until the reaction product is at least swollen by pyridine and contains at least ¼ mol, per $C_6$ unit of the cellulose, of paratoluenesulphonic acid substituent.

29. The process of preparing cellulose esters which comprises reacting a dry substance having the cellulosic nucleus and containing esterifiable hydroxyls with an excess of an aliphatic sulphonyl halide at a temperature from 0° C. to 90° C. until the product is at least swollen by pyridine and contains at least ¼ mol per $C_6$ unit of cellulose of aliphatic sulphonic acid substituent.

30. The process of preparing cellulose esters which comprises reacting a dry substance having the cellulosic nucleus and containing esterifiable hydroxyls with an excess of dodecyl sulphonyl chloride at a temperature from 0° C. to 90° C. until the product is at least swollen by pyridine and contains at least ¼ mol per $C_6$ unit of cellulose of dodecyl sulphonic acid substituent.

GEORGE W. RIGBY.

CERTIFICATE OF CORRECTION.

Patent No. 2,138,778. November 29, 1938.

GEORGE W. RIGBY.

It is hereby certified that error appears in the printed specification of the above numbered patent requiring correction as follows: Page 3, second column, line 74, for "methansulphonyl" read methanesulphonyl; page 5, first column, line 59, claim 20, for "paratoluenesulphonic" read paratoluene-sulphonyl; and second column, line 16, claim 23, for "benzensulphonic" read benzenesulphonic; and that the said Letters Patent should be read with this correction therein that the same may conform to the record of the case in the Patent Office.

Signed and sealed this 10th day of January, A. D. 1939.

Henry Van Arsdale (Seal)                      Acting Commissioner of Patents.